(12) United States Patent
Lagnado et al.

(10) Patent No.: US 10,896,047 B2
(45) Date of Patent: Jan. 19, 2021

(54) BOOTING A COMPUTER USING A WIRELESS NETWORK CONNECTION

(71) Applicant: HEWLETT-PACKARD DEVELOPMENT COMPANY, L.P., Houston, TX (US)

(72) Inventors: Isaac Lagnado, Houston, TX (US); Rahul Lakdawala, Houston, TX (US)

(73) Assignee: Hewlett-Packard Development Company, L.P., Spring, TX (US)

(*) Notice: Subject to any disclaimer, the term of this patent is extended or adjusted under 35 U.S.C. 154(b) by 148 days.

(21) Appl. No.: 15/748,280

(22) PCT Filed: Dec. 28, 2015

(86) PCT No.: PCT/US2015/067719
§ 371 (c)(1),
(2) Date: Jan. 29, 2018

(87) PCT Pub. No.: WO2017/116401
PCT Pub. Date: Jul. 6, 2017

(65) Prior Publication Data
US 2018/0217846 A1    Aug. 2, 2018

(51) Int. Cl.
*G06F 9/4401* (2018.01)
*G06F 21/57* (2013.01)
*H04W 76/11* (2018.01)
*H04W 12/04* (2009.01)
*G06F 3/0482* (2013.01)

(52) U.S. Cl.
CPC .......... *G06F 9/4416* (2013.01); *G06F 21/575* (2013.01); *H04W 12/04* (2013.01); *H04W 76/11* (2018.02); *G06F 3/0482* (2013.01); *G06F 2221/034* (2013.01)

(58) Field of Classification Search
CPC .... G06F 9/4416; G06F 21/575; G06F 3/0482; G06F 2221/034; H04W 76/11; H04W 12/04
See application file for complete search history.

(56) References Cited

U.S. PATENT DOCUMENTS

| | | | |
|---|---|---|---|
| 6,728,875 B1* | 4/2004 | Aguilar | G06F 9/4416 709/203 |
| 6,779,110 B1* | 8/2004 | Aguilar | G06F 9/4416 709/222 |
| 7,127,602 B1* | 10/2006 | Bakke | G06F 9/4416 713/2 |

(Continued)

FOREIGN PATENT DOCUMENTS

| | | |
|---|---|---|
| CN | 103853586 A | 6/2014 |
| KR | 20080095987 A | 10/2008 |

OTHER PUBLICATIONS

PXE Book Using WiFi, Peter Fichtner's Blog, Aug. 31, 2009.

*Primary Examiner* — Aurel Prifti
(74) *Attorney, Agent, or Firm* — HPI Patent Department

(57) ABSTRACT

A system includes an input device and a processor. The processor, in a pre-boot phase, determines whether the input device indicates that the system is to be booted using a wireless network connection; and based at least in a part on the determination, retrieves an identifier for the wireless network connection. The processor uses the identifier to boot the system.

15 Claims, 8 Drawing Sheets

(56) References Cited

U.S. PATENT DOCUMENTS

| | | | | |
|---|---|---|---|---|
| 7,281,068 | B2* | 10/2007 | Davis | G06F 21/575 709/219 |
| 7,406,591 | B2* | 7/2008 | Rothman | G06F 9/4416 713/2 |
| 8,386,618 | B2* | 2/2013 | Bailey | G06F 9/4401 709/227 |
| 8,452,949 | B1* | 5/2013 | Streuter | G06F 9/4408 713/1 |
| 8,631,163 | B1* | 1/2014 | Huang | H04L 41/0806 709/220 |
| 8,938,610 | B2 | 1/2015 | Khosravi et al. | |
| 9,110,679 | B1 | 8/2015 | Chan et al. | |
| 9,401,901 | B2* | 7/2016 | Huang | H04L 63/062 |
| 10,775,871 | B2* | 9/2020 | Garg | G06F 9/4418 |
| 2003/0200428 | A1* | 10/2003 | Chan | G06F 9/4416 713/1 |
| 2004/0123153 | A1* | 6/2004 | Wright | H04L 63/107 726/1 |
| 2004/0128493 | A1* | 7/2004 | Zimmer | G06F 9/4416 713/1 |
| 2004/0268111 | A1* | 12/2004 | Dayan | H04L 12/10 713/2 |
| 2005/0132360 | A1* | 6/2005 | Chu | H04L 67/34 717/177 |
| 2005/0185589 | A1* | 8/2005 | Berbam | H04L 43/0811 370/241 |
| 2005/0239463 | A1* | 10/2005 | Lagnado | H04W 48/18 455/435.2 |
| 2006/0015931 | A1 | 1/2006 | Davis et al. | |
| 2006/0107119 | A1* | 5/2006 | Miller | G06F 11/0748 714/36 |
| 2007/0079359 | A1* | 4/2007 | Lagnado | G06F 21/575 726/4 |
| 2007/0268917 | A1* | 11/2007 | Wong | G06F 9/4416 370/401 |
| 2008/0046708 | A1* | 2/2008 | Fitzgerald | G06F 8/63 713/2 |
| 2008/0195796 | A1* | 8/2008 | Wang | H04L 67/34 711/102 |
| 2008/0229089 | A1* | 9/2008 | Assouad | H04L 41/12 713/2 |
| 2008/0320181 | A1* | 12/2008 | Lauterbach | G06F 9/4416 710/38 |
| 2009/0003229 | A1* | 1/2009 | Loh | H04L 41/0833 370/252 |
| 2009/0113198 | A1* | 4/2009 | Liu | H04L 41/0803 713/2 |
| 2010/0048238 | A1* | 2/2010 | Matsumoto | H04W 8/18 455/552.1 |
| 2010/0191947 | A1* | 7/2010 | Shin | G06F 21/575 713/2 |
| 2010/0257349 | A1* | 10/2010 | Lee | G06F 9/4416 713/2 |
| 2010/0306359 | A1* | 12/2010 | Dehaan | G06F 9/4416 709/223 |
| 2011/0125990 | A1* | 5/2011 | Khosravi | G06F 9/4416 713/2 |
| 2012/0079118 | A1 | 3/2012 | Bailey et al. | |
| 2012/0084838 | A1* | 4/2012 | Inforzato | G06F 21/575 726/4 |
| 2012/0089713 | A1* | 4/2012 | Carriere | H04L 12/4641 709/222 |
| 2013/0247226 | A1* | 9/2013 | Sebes | H04L 63/102 726/29 |
| 2013/0318216 | A1* | 11/2013 | Sakamaki | H04L 41/0813 709/221 |
| 2014/0047095 | A1* | 2/2014 | Breternitz | G06F 9/5072 709/224 |
| 2014/0047230 | A1* | 2/2014 | Khosravi | G06F 9/4416 713/2 |
| 2014/0075172 | A1* | 3/2014 | Knichel | G06F 9/4401 713/2 |
| 2014/0173263 | A1* | 6/2014 | Pfeifer, Jr. | H04L 63/126 713/2 |
| 2014/0213233 | A1* | 7/2014 | Parry | H04W 8/245 455/418 |
| 2014/0373185 | A1* | 12/2014 | Chang | G06F 21/88 726/35 |
| 2015/0147626 | A1* | 5/2015 | Tajima | H05K 5/0086 429/139 |
| 2015/0154033 | A1* | 6/2015 | Qu | G06F 9/4416 713/2 |
| 2015/0234775 | A1 | 8/2015 | Stevens et al. | |
| 2015/0277953 | A1* | 10/2015 | Xu | G06F 9/45558 718/1 |
| 2015/0378702 | A1* | 12/2015 | Govindaraju | G06F 8/61 717/177 |
| 2016/0026477 | A1* | 1/2016 | Chu | G06F 9/4411 713/2 |
| 2016/0210161 | A1* | 7/2016 | Rosset | G06F 11/1417 |
| 2017/0078098 | A1* | 3/2017 | Marquardt | G06F 21/575 |
| 2017/0109176 | A1* | 4/2017 | Shih | G06F 9/4406 |
| 2017/0147361 | A1* | 5/2017 | Kirvan | G06F 9/4416 |
| 2019/0064879 | A1* | 2/2019 | Jeansonne | G06F 1/1632 |

\* cited by examiner

BOOTING A COMPUTER USING A WIRELESS NETWORK CONNECTION

BACKGROUND

When a computer system powers up or is reset, the computer may execute firmware instructions that are stored in a non-volatile semiconductor memory of the computer for purposes of initializing the computer. At the end of this initialization, the computer may identify a boot device, which contains a boot image (operating system (OS) instructions, diagnostic tools, utilities, and so forth), and the computer may initiate a boot sequence to transfer control of the computer to the OS.

DETAILED DESCRIPTION

Figure 1:
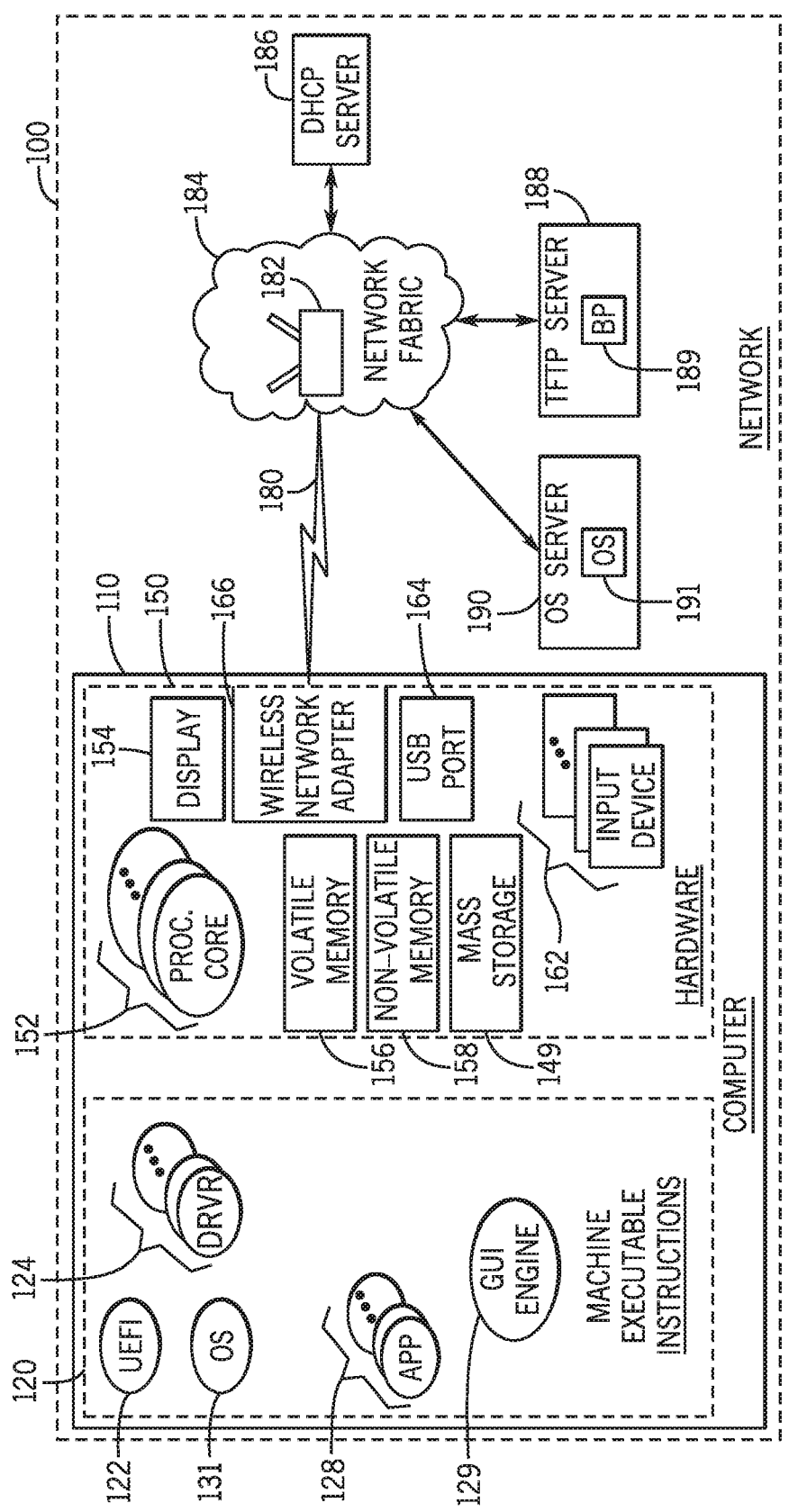
FIG. 1 is a schematic of a network according to an example implementation.

When a computer powers up or is reset, the computer may execute machine executable instructions (called "firmware instructions" herein) that are stored in a semiconductor non-volatile memory (a flash memory, for example) of the computer for purposes of initializing the computer. In this context, a "computer" is an apparatus or system that contains at least one hardware processor that executes machine executable instructions (such as "software" or "firmware" instructions). As examples, the computer may be a desktop computer, a client, a server, a notebook computer, a portable computer, a tablet, a smartphone, a gaming station, and so forth. As examples, the firmware instructions may be basic input output system (BIOS) or unified extensible firmware interface (UEFI) instructions.

As part of its initialization, the computer operates in a pre-boot phase. In this context, the "pre-boot phase" refers to a mode of operation of the computer after power up or reset and before of the computer initiates a boot sequence. In the pre-boot phase, the computer may perform such operations as performing a power on self test (POST) to perform diagnostics of hardware devices (for the case of the computer being powered up) and selecting a boot device (for the case of the computer being powered up and reset). The "boot sequence" generally refers to a sequence of actions taken by the computer to load and transfer control of the computer to an operating system (OS). The "boot device" generally refers to the entity or entities that provide the OS boot image (OS instructions, diagnostic tools, utilities, and so forth). As described herein, the boot device may also provide a set of machine executable instructions (called a "boot loader" herein) that are executed by the computer as part of the boot sequence for purposes of loading certain OS instructions into a memory of the computer and the executing one or multiple processes to transfer control of the computer to the OS.

As examples, the boot device may be physical mass storage device, such as a compact disc-read only memory (CD-ROM) drive, a hard disk drive or a digital versatile disc (DVD) drive, as examples. The boot device may also be a network or a portion thereof. For example, the boot device may be a local area network (LAN) that is coupled to the computer, and one or more servers of the LAN may provide the boot loader and the boot image to the computer.

Example implementations are discussed herein in which the computer contains a wireless network adapter, and the boot device is a network (or portion thereof) that is wirelessly coupled to the computer by the wireless network adapter. For example, in accordance with example implementations, the computer may have access to a wireless local area network (WLAN), such as a "Wi-Fi" network in which communication adheres to one of the IEEE 802.11x standards. In this manner, the computer, in accordance with example implementations, undergoes a boot sequence in which the computer retrieves a boot loader, OS software components, an OS boot image, and so forth using its connection with a Wi-Fi network. The use of such a wireless network connection may be particularly advantageous when the computer does not have a mass storage device or wired LAN interface, which may serve as the computer's boot device. Moreover, even if the computer does a mass storage device or wired LAN interface, booting the computer using a wireless network connection may offer certain advantages. For example, a group of computers may be more readily updated with OS software that is stored on a wirelessly accessible network.

The computer's wireless network adapter may not, however, without the features that are described herein, be configured to communicate over the Wi-Fi network when the computer is in its pre-boot phase and not under OS control. In this manner, in the pre-boot phase, the computer's wireless network adapter may not be programmed with such network configuration parameters as a network identifier (a Service Set Identifier (SSID), for example) or security key for the wireless network. Techniques and systems are described herein for purposes of configuring the wireless network adapter of a computer during a pre-boot phase to allow the computer to be booted using a wireless network connection. In this manner, in accordance with example implementations, an input device of the computer may be used, during the pre-boot phase, to instruct the computer as to whether or not the computer is to be booted up using a wireless network connection. Moreover, in accordance with example implementations, an input device of the computer may be used to, during the pre-boot phase, supply configuration information for the computer's wireless network adapter, such as a network identifier and a security key.

As described herein, in accordance with further example implementations, the computer may, in its pre-boot phase, search for a wireless network that is associated with a predefined wireless network identification, and in response to the search finding such a wireless network, the computer may allow input by a user to control whether the computer is booted up using this wireless network, provide a security key for the wireless network, and so forth.

Moreover, in accordance with further example implementations described herein, the computer may, in the pre-boot phase, determine whether removable media has been installed in the computer, indicating that the computer is to be booted over a wireless network connection, and if so, the computer may use information stored in the removable media to configure its wireless network adapter accordingly so that the computer may boot using the wireless network adapter.

As a more specific example, FIG. 1 depicts a network 100 in accordance with example implementations. The network 100 includes a computer 110 that may be a portable computer, a desktop computer, a laptop computer, a server, a client, a tablet, a smartphone, a gaming station, and so forth. In general, the computer 110 may include one or multiple hardware processing cores 152. As examples, the processing cores 152 may include one or multiple central processing unit (CPU) cores, one or multiple graphical processing unit (GPU) cores, one or multiple embedded processing cores (one or multiple cores associated with a network management controller, for example), and so forth.

In accordance with some implementations, one or multiple processing cores 152 of the computer 110 may execute firmware instructions, such as UEFI machine executable instructions 122, for such purposes as performing diagnostics for the computer 110, providing system management functions for a runtime environment (i.e., OS controlled environment) of the computer 110, initializing the computer 110 (i.e., providing the pre-boot phase and initiating the boot sequence), and so forth. In accordance with further example implementations, the UEFI instructions 122 may be replaced by basic input output system (BIOS) or other machine executable instructions, which at least initialize the computer 110, including providing the pre-boot phase and initiating the boot sequence. Regardless of the specific type of firmware instructions that are executed by the processor(s) 152 to provide the pre-boot phase and initiate boot sequence, the instructions may be stored in a non-volatile memory 158 of the computer 110. As an example, the UEFI instructions 122 may be stored in a non-volatile semiconductor storage device-based memory, such as a flash memory, for example.

After power up or reset of the computer 110, the computer 110 enters a pre-boot phase in which the computer 110 identifies a boot device. One or more entities of the network 100 may potentially serve as the boot device for the computer 110. A challenge with booting up the computer 110 using the network 100 is that the computer 110 connects wirelessly to the network 100 (as shown by wireless connection 187 in FIG. 1), and for the pre-boot phase of the computer 110, a wireless network adapter 166 of the computer 110 may not be, without the features that are described herein, be configured to connect to network fabric 184 of the network 100. As described herein, in accordance with example implementations, the computer 110 is constructed to, during the pre-boot phase, receive configuration information for the wireless network adapter 166 from one or multiple input devices 162 of the computer and use this configuration information to program or configure the wireless network adapter 166 to communicate with the other components of the network 100. In accordance with further example implementations, the computer 110 may be constructed to, during the pre-boot phase, retrieve the configuration information for the wireless network adapter 166 from a removable media device.

As a more specific example, the wireless network connection 180 may be a Wi-Fi connection with a wireless access point 182. In this manner, to connect to the wireless access point 182, the wireless network adapter 166 of the computer 110 uses such configuration information as a network identification (a security set identifier (SSID), for example) and a security key (a Wired Equivalent Privacy (WEP) key, a Wi-Fi Protected Access (WPA) key or a WPA2 key, as examples).

In accordance with example implementations, after the wireless network connection 180 is established, the computer 110 supports remote management functions, such as a pre-boot execution environment (PXE) boot, a Wake on Wireless LAN (WoWLAN) function, and so forth.

As depicted in FIG. 1, the wireless access point 182 may be part of the network fabric 184, which may also include routers, switches, other access points, and so forth. Depending on the particular implementation, the network fabric 184 may establish a wireless network or a combination wireless and wired network. Regardless of the particular implementation, by connecting to the wireless access point 182, the computer 110 may communicate with one or multiple entities of the network 100 that may be used in the boot sequence, such as a Dynamic Host Control Protocol (DHCP) server 186, a Trivial File Transfer Protocol (TFTP) server 188, an OS server 190, and so forth.

In accordance with example implementations, assuming that the computer 110 is to be booted using the wireless network connection 180 (and the wireless network adapter 166 has been programmed accordingly with the configuration information), the computer 110 may function as a PXE agent that operates in a PXE environment as follows. First, the computer 110 communicates with the DHCP server 186 to acquire an Internet Protocol (IP) address for the computer 110. After acquiring its IP address, the computer 110 may communicate with a PXE redirection service (such as a service provided by a proxy DHCP server (not shown), for example) to locate the TFTP server 188. The TFTP server 188 may then, in accordance with example implementations, provide a boot loader 189, which is downloaded by the computer 110. In this manner, the boot loader, when executed by one or multiple processing cores 152 of the computer 110, causes the computer 110 to, in general, communicate with the OS server 190 to download an OS image 191 and execute one or multiple processes to transition control of the computer 110 to the OS. The servers 186, 188 and 190 may be provided by one or multiple physical machines, depending on the particular implementation.

In accordance with example implementations, the computer 110 is a physical machine that is made up from machine executable instructions 120, or "software," and actual hardware 150. The machine executable instructions 120 may include instructions that are executed during the pre-boot phase, such as the UEFI instructions 122 and instructions 129 that provide a graphical user interface (GUI) engine 129, as further described herein. The machine executable instruction 120 also includes instructions that are loaded as part of the computer's boot sequence, such as an OS 131, one or multiple applications 128, one or multiple drivers 124, and so forth.

In accordance with example implementations, in addition to the non-volatile memory 158, the processing core(s) 152 and the wireless network adapter 166, the hardware 150 may include one or multiple input devices 162 (a keyboard, a touchscreen interface, a mouse, a stylus, one or multiple control buttons, and so forth), one or multiple Universal Serial Bus (USB) ports 164, a mass storage device 149, a display 154, a volatile memory 156, and so forth.

Figure 2:
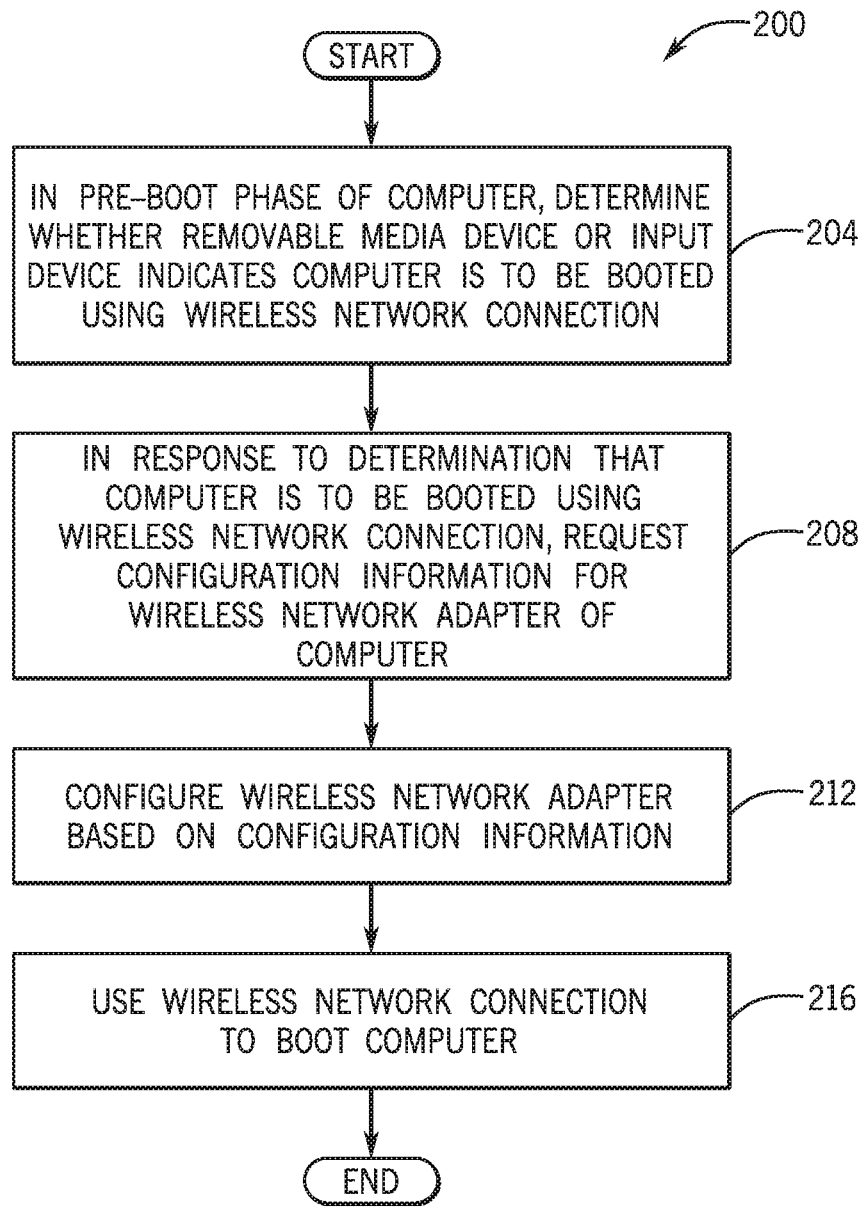
FIG. 2 is a flow diagram depicting a technique to boot a computer using a wireless network connection according to an example implementation.

Referring to FIG. 2, in accordance with example implementations, a technique 200 includes, in a pre-boot phase of a computer, determining (block 204) whether a removable media device or an input device of the computer indicates that the computer is to be booted using a wireless network connection. Pursuant to the technique 200, in response to the determination that the computer is to be booted using the wireless network connection, configuration information for a wireless network adapter of the computer is requested, pursuant to block 208. The wireless network adapter is then configured based on the configuration information (block 212), and the wireless network connection is used (block 216) to boot the computer.

Figure 3:
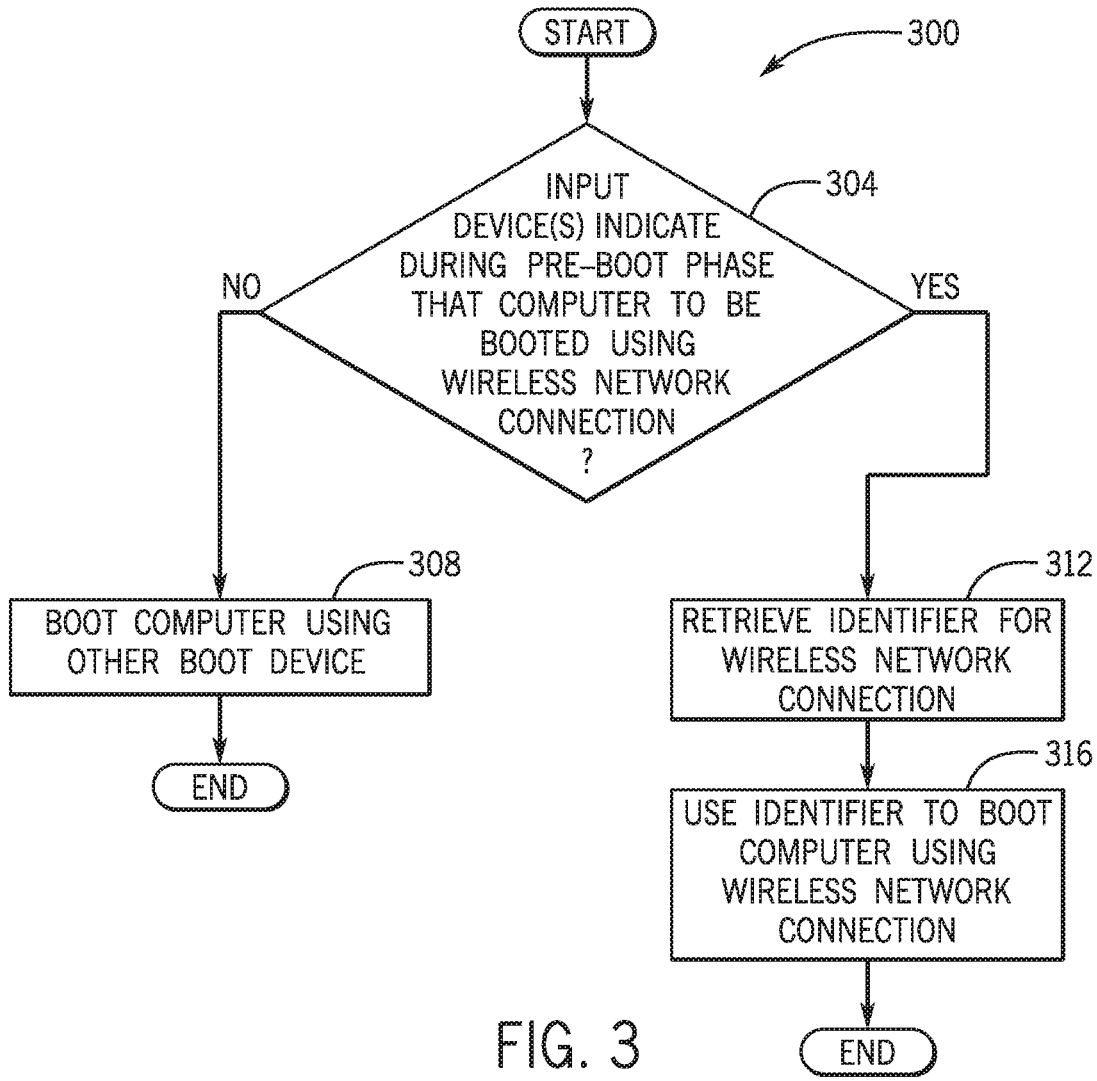
FIG. 3 is a flow diagram depicting a technique to boot a computer using input acquired during a pre-boot phase of the computer according to an example implementation.

For example implementations in which an input device of the computer 110 is used for purposes of indicating, during the pre-boot phase, that the computer is to be booted up using a wireless network connection, the input device may be one of the input devices 162. In this manner, depending on the particular implementation, the an input device 162 such as one or multiple buttons (side buttons on a portable device, such as a tablet), a touchscreen input interface, a keypad, a keyboard, a stylus, and so forth, may be used to request wireless booting of the computer 110. More specifically, referring to FIG. 3, pursuant to a technique 300, the computer may determines (block 304) whether one or multiple input devices indicate, during the pre-boot phase, that the computer is to be booted up using a wireless network connection. Pursuant to the determination (decision block 304), the computer either boots up the computer using another boot device (block 308); or the computer proceeds to retrieve (block 312) an identifier for the wireless network connection so that the identifier may be used to boot the computer using a wireless network connection, pursuant to block 310.

As a more specific example, in accordance with some implementations, a user may, during the pre-boot phase, use one or multiple input devices of the computer 110 to indicate the desire for the wireless boot. For example, in accordance with some implementations, the user may depress an F10 function key in the pre-boot phase, which causes the GUI engine 129 to display a boot menu 400 (FIG. 4A) on the display 154 of the computer 110. More specifically, referring to FIG. 4A in conjunction with FIG. 1, in general, the boot menu 400 allows the user to re-designate the first priority boot device; and in accordance with example implementations, the GUI engine 129 may allocate a predetermine time for the re-designation to occur before the computer 110 proceeds with booting from a predesignated first priority boot device (a mass storage drive, for example).

Figure 4A:
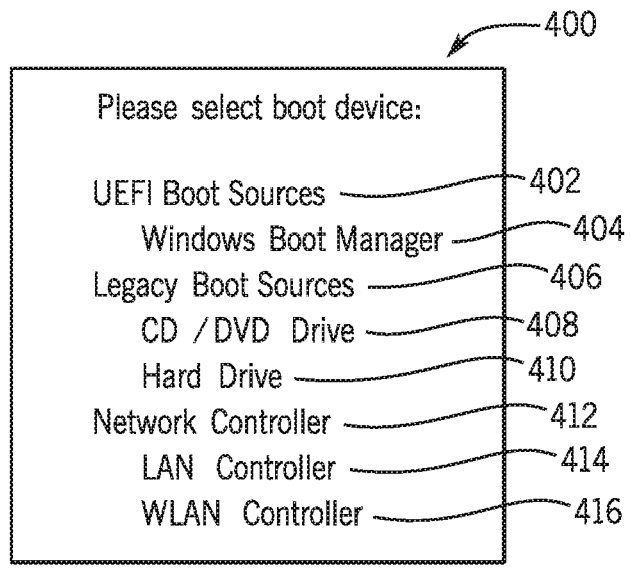
FIGS. 4A, 4B, 7A and 7B are menus displayed by a graphical user interface (GUI) engine of a computer in a pre-boot phase according to example implementations.

As shown in the example implementation of FIG. 4A, the boot menu 400 may include an option 402 to boot from an UEFI boot source, such as the Windows boot manager 404 or boot from a legacy boot source 406, such as a CD/DVD drive 408 or hard drive 410. As also depicted in FIG. 4A, the boot menu 400 may further provide an option 412 to boot from a network, i.e., a network controller. One of the options for the network boot involves the use of a LAN controller 414, and the other network controller option 412 involves the use of a WLAN controller 416. More specifically, the GUI 400 may allow the user to use the keyboard, for example, to highlight one of the boot options presented by the GUI 400 to select the primary boot device. For purposes of booting over the wireless network connection 180, the user may highlight and select the WLAN controller option 416 (i.e., move the cursor over the option 416 and depress the ENTER key).

Figure 4B:
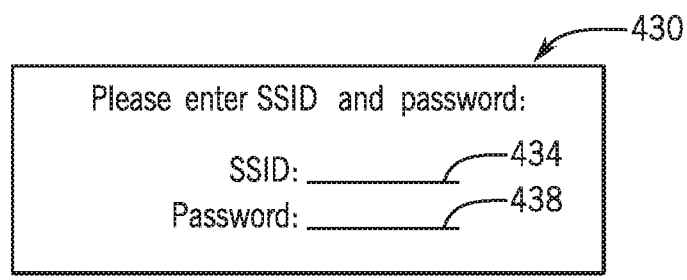

Thus, by user input, the user may use the boot menu 400 to indicate to the computer 110 that the computer 110 is to be booted using a wireless network connection. In accordance with example implementations, in response to the selection of the WLAN controller option 416, the GUI engine 129 may display a window 430, which is depicted in FIG. 4B. Referring to FIG. 4B in conjunction with FIG. 1, through the window 430, the GUI engine 129 requests the user to enter (as an example implementation) an SSID (via the text entry field 434) and a password (via the text entry field 438) for the wireless network adapter 166. Upon entry of the SSID and security key, the computer 110 configures the wireless network adapter 166 and proceeds with the wireless boot, as described above. In accordance with example implementations, the computer 110 may allocate a predetermined time for entering the network configuration information via the window 430 before otherwise cycling back to the window 400 or booting from a predesignated boot device.

Figure 5:
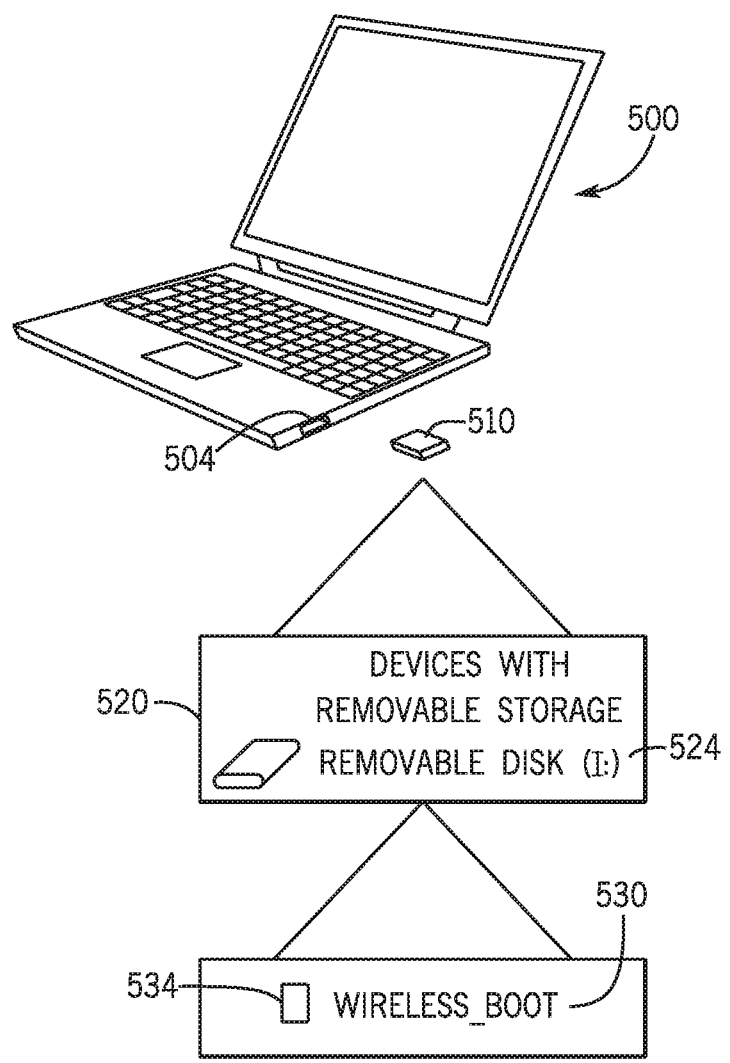
FIG. 5 is an illustration of a system in which a removable media device may be used to control booting of a computer according to a further example implementation.

In accordance with further example implementations, a removable media device may be used to indicate to a computer that the computer is to be booted using a wireless network connection. Moreover, the removable media device may also, in accordance with example implementations, be used to provide the configuration information for the wireless network adapter 166. More specifically, referring to FIG. 5, a computer, such as a portable computer 500, may include a USB port 504, which may receive a removable media device 510 (a USB dongle or flash drive, as examples). The removable media device 510 may contain data in a predefined format that both indicates to the computer 500 that a boot over a wireless network connection is to be performed and also indicates the configuration for the computer's wireless network. In this manner, as depicted in FIG. 5, the computer 500, may, during its pre-boot phase, search for a removable network drive (here, network drive I: 524). The network drive I: includes a file having a predefined name 530, such as "WIRELESS_BOOT" in FIG. 5). Upon recognizing the predefined file name 530, the computer 110 may then extract data from the file 534 or other file/location of the removable media device 510, representing the SSID and security key for the computer's wireless network adapter.

Figure 6:
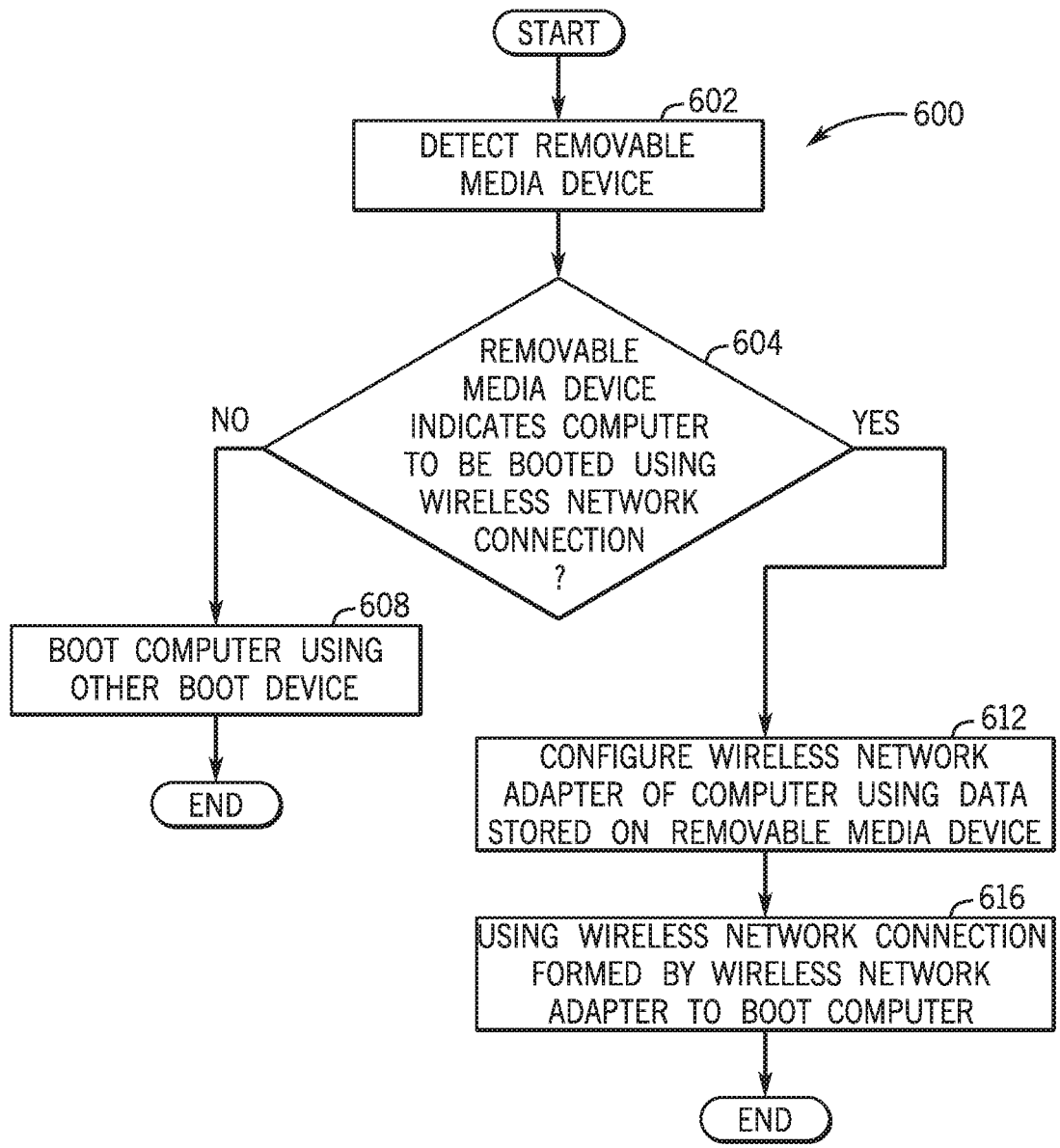
FIG. 6 is a flow diagram depicting a technique to use a removable media device to control booting of a computer using a wireless network connection according to an example implementation.

Thus, referring to FIG. 6, in accordance with example implementations, a technique 600 includes detecting (block 602) a removable media device in a computer and determining (decision block 604) whether the removable media indicates that the computer is to be booted using a wireless connection. If so, the technique 600 includes configuring a wireless network adapter of the computer using data stored on the removable media device, pursuant to block 612. It is noted that the technique 600 may further include retrieving a security key or other configuration information for the wireless network. The technique 600 includes using (block 616) the wireless network connection formed by the wireless network adapter to boot the computer. If the computer determines (decision block 604) that a removable media device does not contain data indicating that the computer is to be booted using the wireless connection, then the computer may boot using another boot device, pursuant to block 608.

Figure 7A:
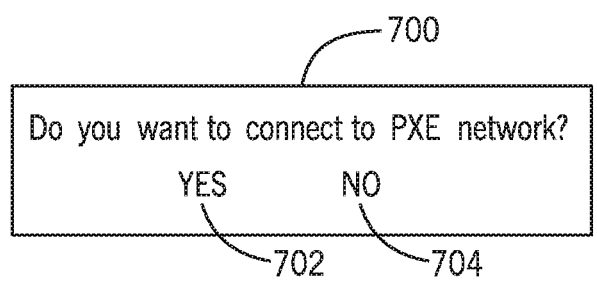
Figure 7B:
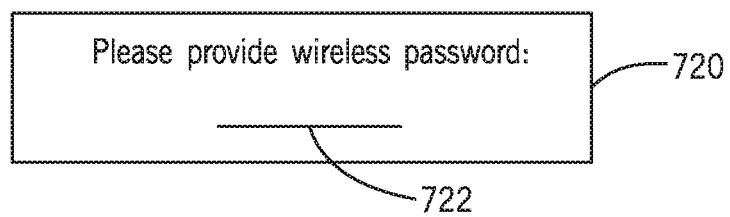

In accordance with further example implementations, the computer may search for a predefined network name (a predefined broadcast SSID, for example); and upon finding such a predefined network name, the computer may prompt a user to inform the computer whether the computer is to be booted up using a wireless network connection that is associated with the predefined network name. As a more specific example, referring to FIG. 7A in conjunction with FIG. 1, in accordance with some implementations, the GUI engine 129 may display a window 700 upon recognizing a wireless network that is associated with a predetermined name. Depending on the particular implementation, the computer 110 may search for one or multiple predefined network names from a group of one or multiple network names. As shown in FIG. 7A, upon identifying such a network, the GUI engine 129 may request, via the window 700, whether the user wants the computer 110 to connect to a PXE network and present a YES option 702 and a NO option 704. The user may, for example, highlight the desired option 702 or 704, and depress the ENTER key for purposes indicating whether or not the computer 110 is to be booted using the wireless connection. If the user selects the YES option 702, then, in accordance with example implementations, the GUI 110 displays another window 720 that is depicted in FIG. 7B. As shown, the window 720 may, in accordance with example implementations, request a wireless password for the identified network. Upon entering the proper security key or password in the text field 722, the computer 110 may then configure the wireless network adapter 166 and proceed with the wireless boot.

Figure 8:
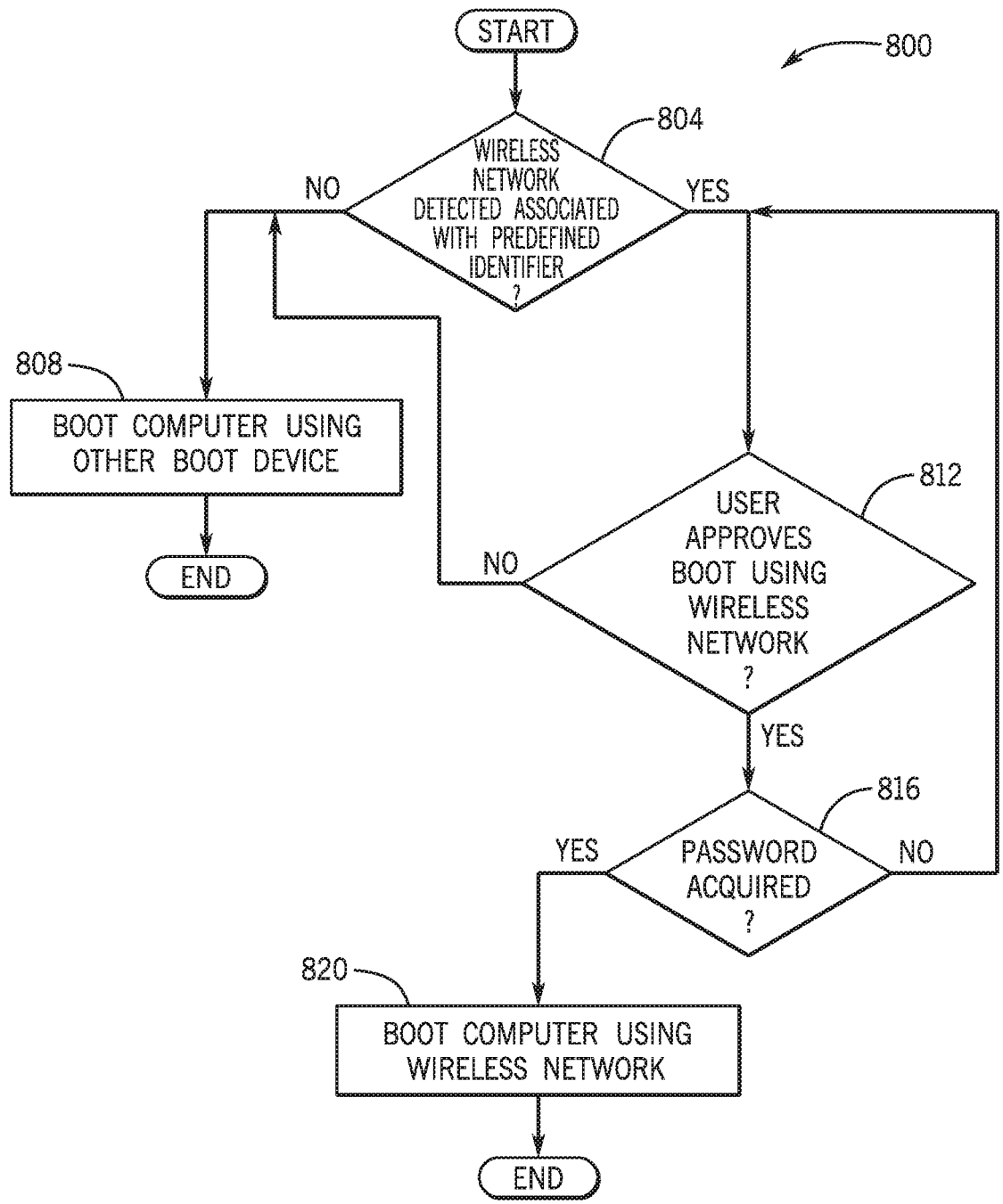
FIG. 8 is a flow diagram depicting a technique to boot a computer using a wireless network connection associated with a predefined network identifier according to a further example implementation.

Thus, referring to FIG. 8, in accordance with example implementations, a technique 800 includes determining (decision block 804) whether a wireless network that is associated with a predefined identifier is detected and if so, determining (decision block 812) whether the user approves the wireless boot. If so, then, in accordance with example implementations, the computer 110 determines (decision block 816) whether a password for the network has been acquired, and if so, the computer boots using the wireless network, pursuant to block 820. If either the computer 110 determines (decision block 804) that a wireless network that is associated with a predefined identifier has not been detected or determines (decision block 812) that the user does not approve of booting up using the wireless network, then the computer 110 may boot the computer using another boot device, pursuant to block 804.

Other implementations are contemplated, which are within the scope of the appended claims. For example, in accordance with further example implementations, the wireless connection may be associated with a wireless communication standard other than the Wi-Fi, such as (as examples), the IEEE 802.11ad standard (also called "WiGig") or the Bluetooth standard managed by the Bluetooth Special Interest group.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A system comprising:
   an input device; and
   a processor to:
      in a pre-boot phase, determine whether the user input device indicates that the system is to be booted from a remote boot device received from a wireless network connection accessed via a wireless network adapter of the system selected over a predesignated higher-priority local boot device on a mass storage device of the system, wherein the selection is between a first network controller and a second network controller; and
      based at least in a part on the determination, retrieve an identifier for the wireless network connection, the identifier including a network identifier and a security key; and
      use the identifier to configure the wireless network adapter during the pre-boot phase to access the remote boot device via the wireless network connection.

2. The system of claim 1, wherein:
   a key entry associated with the input device indicates that the system is to be booted using the wireless network connection.

3. The system of claim 2, further comprising a display, wherein:
   the processor causes the display to display a boot menu, the boot menu comprising an option to boot the system using the wireless network connection, and
   the identifier is entered using the boot menu.

4. The system of claim 2, wherein the processor, in response to the key entry, requests entry of data corresponding to the identifier for the wireless network connection.

5. The system of claim 1, wherein the processor, based on least in part on the determination, further retrieves a security key for the wireless network.

6. The system of claim 1, further comprising a memory to store unified extensible firmware interface (UEFI) instructions, and the processor executes the UEFI instructions to determine whether the input device indicates that the system is to be booted using the wireless network connection and retrieve the identifier for the wireless network connector.

7. An article comprising a non-transitory computer readable storage medium to store instructions that when executed by a computer cause the computer system to:
   in a pre-boot phase, configure a wireless network adapter with a network identifier and security key to detect whether a predefined wireless network associated with the network identifier is available for connection with the computer;
   comprising based at least in part on a result of the detection and a user input, use the wireless network to receive a remote boot device to boot the computer selected over a predesignated higher-priority local boot device on a mass storage device of the system, wherein the selection is between a first network controller and a second network controller; and
   boot the computer with the local boot device when the wireless network is not available.

8. The article of claim 7, the computer readable storage medium to store instructions that when executed by the computer cause the computer to:
   in response to detecting the wireless network, prompt for input indicating whether the predefined wireless network is to be used to boot the computer.

9. The article of claim 7, the computer readable storage medium to store instructions that when executed by the computer cause the computer to:
   in response to detecting the wireless network, prompt for input indicating a security key to be used for accessing the wireless network.

10. The article of claim 7, the computer readable storage medium to store instructions that when executed by the computer cause the computer to:

boot from a network device not part of the wireless network in response to failed detection of the wireless network associated with the predefined identifier.

11. A method comprising:

detecting a removable media device installed in a computer;

determining whether the removable media device indicates that the computer is to be booted from a remote boot device received from a wireless network connection accessed via a wireless network adapter of the computer selected over a predesignated higher-priority local boot device on a mass storage device of the computer, wherein the selection is between a first network controller and a second network controller; and in response to the determination, selectively configuring the wireless network adapter of the computer during the pre-boot phase based on data stored on the removable media device including a network identifier and a security key to establish the wireless network connection and using the wireless connection formed by the wireless network adapter to receive the boot device and boot the computer.

12. The method of claim 11, wherein:

the removable media device indicates that the computer is to be booted using a wireless network connection by containing data in a predefined format; and receiving the configuration data comprises retrieving an identifier for the wireless network adapter from the data.

13. The method of claim 11, wherein using the wireless network adapter to boot the computer comprises retrieving a boot image.

14. The method of claim 11, wherein determining whether the removable media device indicates the computer is to be booted using a wireless network connection comprises searching data stored on the removable media device to determine whether the data contains the configuration information.

15. The method of claim 11, wherein using the wireless network adapter to boot the computer comprises retrieving a boot loader.

* * * * *